United States Patent [19]
Ziemek et al.

[11] 3,753,287
[45] Aug. 21, 1973

[54] METHOD OF INTERCONNECTING TWO COAXIAL TUBE SYSTEMS

[75] Inventors: Gerhard Ziemek, Hannover; Friedrich Schatz, Langenhagen, both of Germany

[73] Assignee: Kabel-und Metallwerke Gutehoffnungshutte Aktiengesellschaft, Hannover, Germany

[22] Filed: Sept. 15, 1971

[21] Appl. No.: 180,796

[30] Foreign Application Priority Data
Sept. 21, 1970 Germany.................. P 20 46 331.4

[52] U.S. Cl................ 29/470.5, 29/471.1, 156/49, 156/158, 285/DIG. 4, 285/133
[51] Int. Cl.............................................. B23k 31/02
[58] Field of Search............................... 161/145; 156/157–158, 49, 304, 393; 138/120–121; 285/DIG. 4, 133 R, 370, 397, 417; 29/470.5, 471.1, 472.1

[56] References Cited
UNITED STATES PATENTS
3,635,504  1/1972  Borden et al. ................. 156/158 X FOREIGN PATENTS OR APPLICATIONS
62,953   7/1892  Germany .......................... 138/120
987,514  3/1965  Great Britain ..................... 156/49

*Primary Examiner*—Richard B. Lazarus
*Attorney*—Ralf H. Siegemund et al.

[57] ABSTRACT

Method of interconnecting two coaxial tube systems, each having at least two corrugated coaxial tubes, by providing innermost tubes of the two systems to be interconnected and at slightly smaller or larger diameter, respectively in or on the end portions of the said two innermost tubes in corrugation contour matching and fitting relation; bonding the axial ends of the first sleeve or of the two innermost tubes respectively to the two innermost tubes or both first sleeves; telescoping a second sleeve of slightly smaller or larger diameter than the next, outer tubes of each system in corrugation receiving relation to the axially displaced ends of the outer tubes, bonding the second sleeve to the outer tubes.

10 Claims, 2 Drawing Figures

Patented Aug. 21, 1973 3,753,287

INVENTORS:
Gerhard Ziemek
Fredrich Schatz

ATTORNEYS

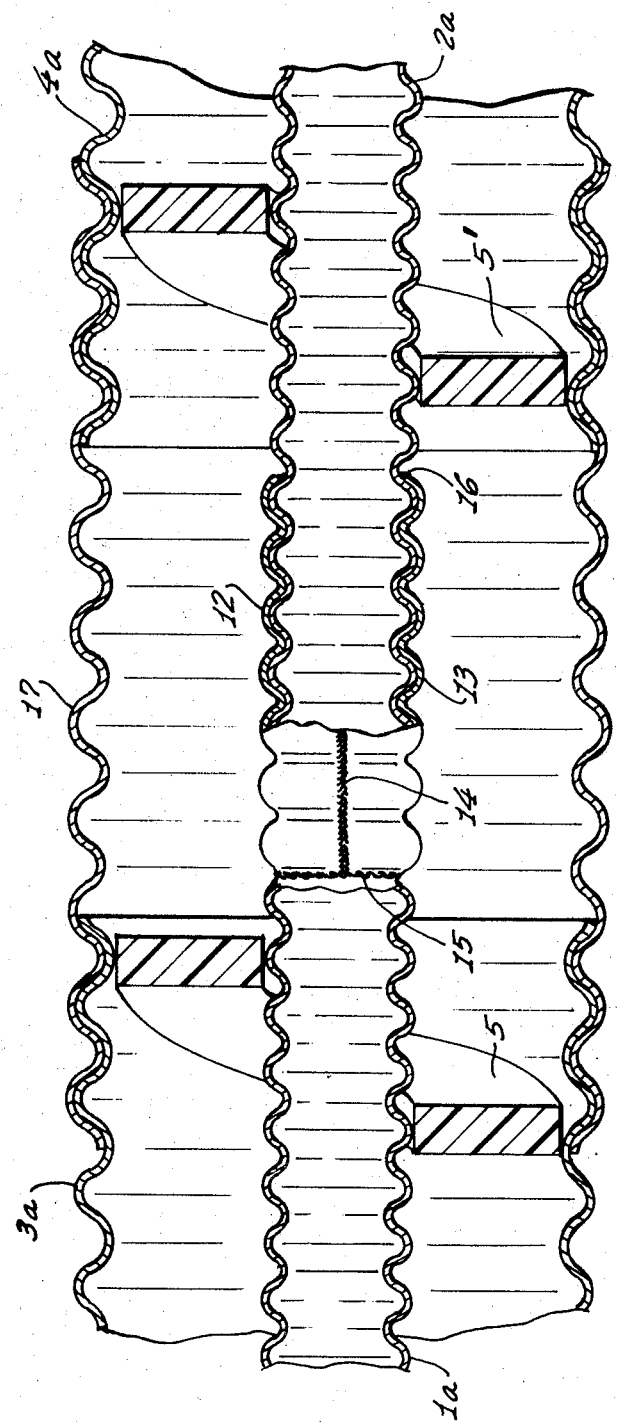

METHOD OF INTERCONNECTING TWO COAXIAL TUBE SYSTEMS

The present invention relates to a method for interconnecting coaxial tube or pipe systems; it is assumed that the individual tubes of each system are corrugated, and the invention is particularly directed to coaxial interconnecting, high frequency cables or cables with superconductive conductors contained in corrugated tubular envelopes.

The interconnection of coaxial tube systems wherein the individual tubes are corrugated is complicated because of the corrugation. Corrugation is, however, a very desirable feature for reasons of flexibility, permitting reeling of the tubing even if having relatively thick walls. The end-to-end connection between such tubes shall be of sufficient mechanical strength, and if the tubes serve as conductor, an electrically satisfactory connection is to be made between them and maintained. Previously high frequency cables of the coaxial tube variety with corrugated, tubular conductors have been interconnected by means of special plug and connector elements. Particular connectors were individually connected to the tubular conductors, and connectors on different tubes were then interconnected. Of course, such plug elements require very accurate manufacturing, and they increase cost of the entire system particularly because the plug and connector elements are separate auxiliary components in the nature of accessories.

It is the object of the present invention to provide method which permits the connection of coaxial tube systems at high mechanical strength and low cost while satisfactory electrical connection as needed in case of cables, is ensured. In accordance with the method of the present invention, the several coaxial tubes of a coaxial tube system are interconnected in stepwise fashion beginning by interconnecting the innermost tubes by means of a sleeve having matching corrugation pattern, but slightly larger or smaller diameter than the innermost tubes. The sleeve is seated on or inserted into the ends of the two tubes and bonded, e.g., soldered or welded thereto. Axially aligned tubes of next larger diameter of the two systems, are interconnected analogously, so that progressively tubes to be interconnected are interconnected indirectly by means of an overlapping or inserted sleeve.

The advantage of the invention is to be seen in that upon utilizing such connector sleeve of similar corrugation pattern as the tubes themselves, a mechanically strong and firm connection is almost automatically established. Soldering or welding, of course, aids in the establishing of the mechanical connection, but the primary purpose of such bonding is to provide also for an electrically satisfactory connection. Another advantage of the invention is to be seen in that as a consequence of making the connection the diameter of the tube system is only insignificantly changed so that after providing a protective coating or jacket onto the outermost tube of the system the joint is no longer or hardly visible. Also, it can readily be seen that phase coherency of the corrugation pattern through the joint is inherently provided for the connector sleeves, so to speak, continued the phase from one tube to the next one.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 illustrates a similar section view with a modification of the interconnection as provided.

Figure 1:
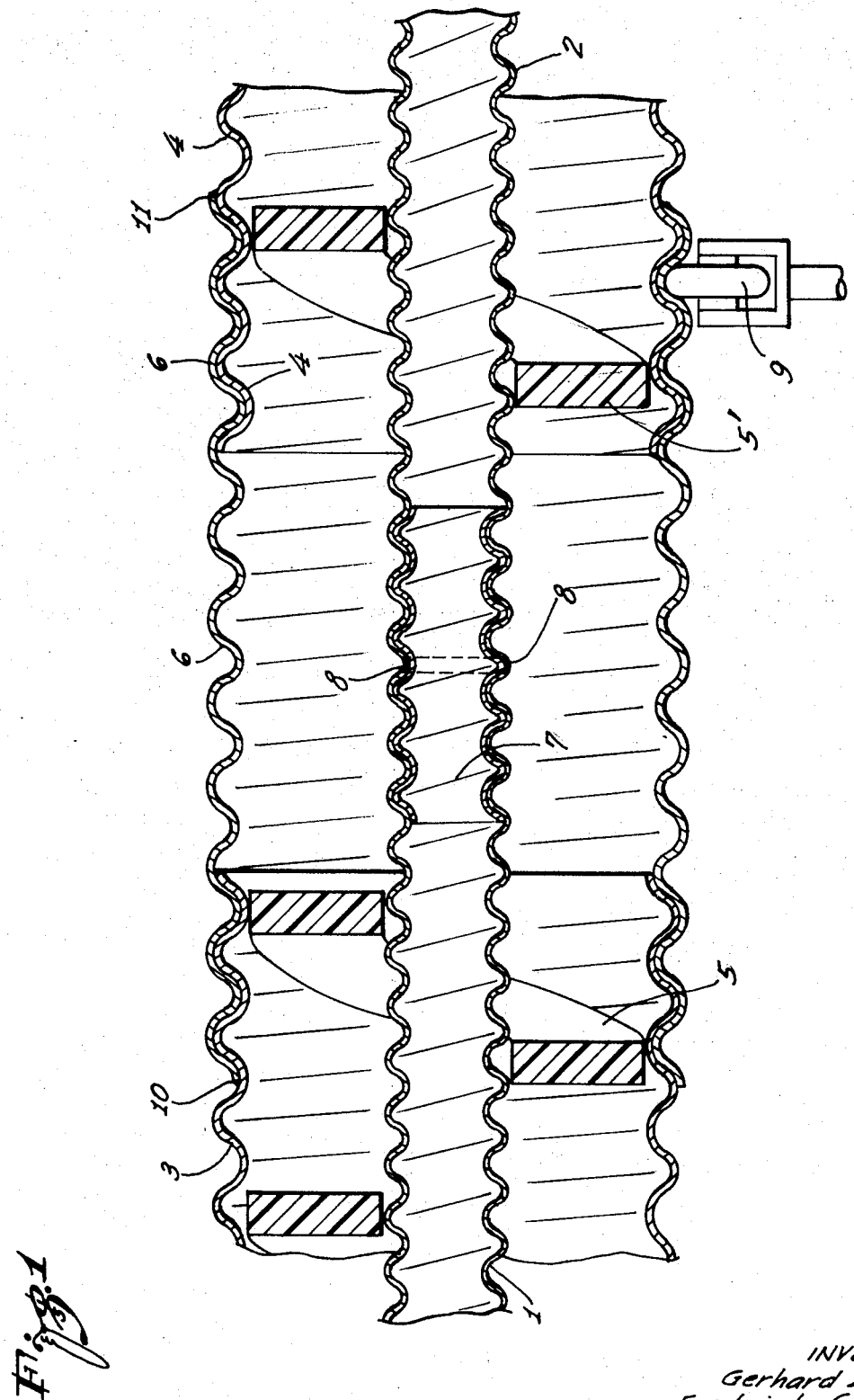
FIG. 1 illustrates schematically a cross section view through a coaxial high frequency cable system interconnected in accordance with the preferred embodiment of the present invention.

Proceeding now to the detailed description of the drawing, reference numerals 1 and 3 respectively denote inner and outer tubes of a first coaxial tube system to be interconnected with a second system that includes tubes 2 and 4. In particular, 1 and 2 constitute the inner conductors of two high frequency cables to be interconnected and tubes 3 and 4 are the respective outer conductors. A helical spacer 5 is provided between tubes 1 and 3 to maintain coaxial position between these tubes. Analogously, a spacer 5' is provided to coaxially position tube 4 on tube 2. Therefore, a concentrical relationship is established in each of the two tubular conductor systems.

In the particular example illustrated, all of the tubes are corrugated whereby in particular all tubes are provided with helical corrugation. Corrugation is needed for each tubular conductor system to have sufficient flexibility. Now, it is assumed that the tube system 1-3 is to be connected to the system 2-4, whereby in particular, of course, inner tubes 1 and 2 are to be interconnected and outer tubes 3 and 4 are likewise to be interconnected separately. This interconnection is carried out as follows.

First of all, a portion of the outer conductors 3 and 4 is cut off so that the particular ends of tubes 1 and 2 to be interconnected respectively, protrude from tubes 3 and 4; the several tubes are actually shown in this fashion in FIG. 1. Next, a sleeve 6 is provided having these characteristics: Sleeve 6 has diameter almost similar to diameter of outer tubes 3 and 4, except that sleeve 6 is slightly larger, the difference being about equal to twice the wall thickness of tubes 3 and 4. Sleeve 6 has corrugation similar to the corrugation of these tubes, particularly as to pitch of the helix, and wave length and amplitude of the corrugation pattern defined in any axial plane including the plane of the drawing are similar accordingly.

Sleeve 6 is now threaded on one of the tubes, e.g. tube 3. The cut away portions at the ends of tubes 3 and 4 must leave sufficient space between the tubes to permit that operation. However, the flexibility of the two pipe systems is instrumental here in permitting readily the bending of the end of one system out of the way. The sleeve 6 is now screwed onto tube 3 almost all the way, to leave substantially a wide gap at first.

Next, a sleeve 7 is provided having diameter almost similar to the diameter of tubes 1 and 2, but being slightly smaller than those. The difference being also primarily determined by the thickness (twofold) of the walls of tubes 1 and 2. Also, the tube or sleeve 7 has corrugation similar to the corrugation of tubes 1 and 2. Sleeve 7 is now in effect threaded almost all the way into one of the inner tubes, e.g. tube 1. Sleeve 7 is to protrude from tube 1 to such an extent only so as to permit gripping of the sleeve by a suitable bolt turning tool.

Next, tube 2 is placed coaxially and as close as possible to the end of tube 1, and now the sleeve 7 is, so to speak, unscrewed partially from tube 1, and thereby screwed into tube 2 until approximately similar portions of sleeve 7, slightly less than half the length of the sleeve, are inserted in each of the tubes 1 and 2. Thereafter, the ends proper of tubes 1 and 2 are soldered or welded to sleeve 7. The remaining gap between the ends of tubes 1 and 2 is filled with material preferably electrically conductive material such as lead.

Subsequently, sleeve 6 that was partially screwed onto the outer tube 3, is now partially unscrewed therefrom and the right end of sleeve 6 will be screwed onto tube 4. Again, sleeve 6 will be turned on its axis until approximately similar long end portions of tubing 3 and 4 are screwed into and received in opposite ends of sleeve 6.

FIG. 1 illustrates in addition of particular roller tool 9 to work sleeve analogous to metal spinning pursuant to which the valleys of the corrugation of sleeve 6 are forced into the valleys of the corrugation of tubes 3 and 4, to provide intimate contact and engagement between the sleeve ends and the tubes. The annular end faces of sleeve 6 are subsequently welded to the otuer conductor tubes 3 and 4 at locations 10 and 11.

The procedure outlined above is applicable to tube systems with more than two tubes arranged in coaxial relationship. One will screw the respective sleeves into the tubes of one system, and subsequently the sleeves are turned in the reverse to screw them into the respective tubes of the other system, beginning with a sleeve such as 7 for interconnecting the innermost tubes of the two systems; the subsequent sleeves, such as 6, are progressively and threadedly turned to interconnect the respectively aligned outer tubings, beginning with the second innermost up to the outermost.

The embodiment described with reference to FIG. 1 does, of course, depend upon a corrugation pattern that is helical, so that sleeve insertion and positioning can be done by operation analogous to bolt threading. However, the invention is not restricted to application to tube systems with helical corrugation. The embodiment to be described with reference to FIG. 2 assumes the threading to be annularly or parallel. It is not possible in such a case to thread any sleeve on or into the respective tube end, so that the two such tube systems must be interconnected somewhat differently.

One coaxial tube system is denoted here with the reference numerals 1a and 3a; the other one bears reference numerals 2a and 4a, the corrugation being circular parallel as assumed. In this case now the sleeves to be used for interconnection, are axially split twofold, so that in the beginning, there are two separate halves for each sleeve. A sleeve is completed subsequently by axial welding the two halves along two oppositely positioned welding seams.

Again, the tube system is prepared as before, so that the inner tubes project from the respective outer tubes. Also as before, the pair of aligned innermost tubes are to be interconnected first. It may be advisable to weld the two inner tubes 1a and 2a together, but it is important that they are cut each to obtain corrugation pattern phase coherency. Next, two sleeve halves 12 and 13 are laterally placed onto and around the juxtaposed ends of tubes 1a and 2a, and they are welded to obtain two axial welding seams such as 14, to complete that particular sleeve for jacketing and interconnecting the two ends of tubes 1a and 2a. In addition, the axial ends of the resulting sleeve are welded respectively to tubes 1 and 2, there being annular welding seams 15 and 16 accordingly. This procedure is repeated as far as the two outer tubes 3 and 4 are concerned. The sleeve 17 is presented as two halves, which are laterally placed from opposite sides onto tubes 3 and 4, and through axial welding the connector sleeve 17 is completed.

It can readily be seen that more than two tubes in each system can be so connected to the respective tubes of another coaxial tube system. It can also be seen that the inventive method can be practiced even if the several tubes of different diameter have different types of corrugation, e.g. the innermost tubes may have circular corrugation, the outer tubes may have helical corrugation (or vice versa). Sleeve halves with axial welding are used in one case which does not preclude utilization of sleeve threading as described for the other case.

It should also be mentioned finally that an apparent difference in phase coherency as far as the corrugation pattern of tube 3 and 4 is concerned, can readily be taken up by axial expanding or contracting the corrugation of the outer tubes, as they have axial flexibility, so as to readily fit into the corrugation of the connector sleeve.

The invention is not limited to the embodiments described above but all changes and modifications thereof not constituting departures from the spirit and scope of the invention are intended to be included.

We claim:

1. Method of interconnecting two coaxial tube systems, each having at least two corrugated coaxial tubes comprising the steps of:

providing a first sleeve having similar corrugation as the respective innermost tubes of the two systems to be interconnected and at slightly differing diameter than either of said innermost tubes placing the two axial ends of the first sleeve respectively adjacent to the end portions of the said two innermost tubes and in concentric, axially overlapping as well as in corrugation matching, receiving and fitting relation thereto and for a certain span on each axial end of the first sleeve, so that the ends of the innermost tubes on one hand, and the ends of the first sleeve on the other hand are placed into each other in telescoping relationship to obtain innermost assembled tubing constituted by said first sleeve and by said innermost tubes, and having a phase coherent wave pattern in axial cross section as to their corrugation, said first sleeve and said two innermost tubes together having four axial ends, said innermost tubing when assembled having only two of said axial ends outwardly exposed while being radially aligned with wall portions of that part of the innermost tubing having the other two axial ends; bonding said axial end faces to the said wall portions of the innermost tubing having said other two axial end faces; disposing a second sleeve of slightly different diameter than the next, outer tubes of each system in corrugation receiving relation to the axially displaced ends of the outer tubes and in telescoping relation therewith respectively adjacent the two axial ends of the second sleeve; and bonding the second sleeve to the outer tubes.

2. Method as in claim 1, wherein at least two respective tubes of the two systems to be interconnected as well as the respective sleeves are helically corrugated, for the sleeve to be threaded first onto one of the two tubes, and subsequently partially unscrewing the sleeve therefrom again while threading the other end of the sleeve into or onto the respective other tube.

3. Method as in claim 2, wherein the sleeve is threaded into the two tubes, there remaining a gap between the two tubes, covered from the interior by the sleeve, and including the step of filling the gap with electrically conductive material.

4. Method as in claim 1, wherein at least two respective tubes of the two systems to be interconnected have circular corrugation, the respective sleeve originally made of two or more axially divided parts, each placed in corrugation contour fitting relation to the ends of the two tubes, and axially welding the parts to combine them for providing the sleeve.

5. Method as in claim 1, preceded by the step of preparing the two systems so that in at least one end of the innermost tube projects axially beyond the end of the next outer tube.

6. Method as in claim 1, wherein at least two respective tubes of the two systems to be interconnected as well as the respective sleeves are helically corrugated, for the sleeve to be threaded first into one of the two tubes, and subsequently partially unscrewing the sleeve there-from again while threading the other end of the sleeve onto the respective other tube.

7. Method as in claim 1, wherein the first sleeve has slightly smaller diameter than the diameter of the two innermost tubes, causing the first sleeve to be received adjacent opposite axial ends respectively by the two innermost tubes, said first mentioned bonding step established by bonding the axial ends of the two innermost tubes to the wall of the first sleeve.

8. Method as in claim 1, wherein the first sleeve has slightly larger diameter than the diameters of the two innermost tubes, the telescoping including causing the ends of the two innermost tubes respectively to be received at opposite axial ends of the sleeve, said first mentioned bonding step established by bonding the axial ends of the sleeve respectively to the walls of the two innermost tubes.

9. Method as in claim 1, wherein at least two respective tubes of the two systems to be interconnected have circular corrugation, the respective sleeve originally made of two or more axially divided parts, each placed in corrugation contour fitting relation to the ends of the two tubes, and axially soldering the parts to combine them for providing the sleeve.

10. Method as in claim 1, wherein the first sleeve axially overlays with respect to said two tubes for more than one corrugation wavelength in axial direction on each end of the first sleeve.

* * * * *